Jan. 3, 1961 H. HURVITZ 2,967,274

RECORDING SPECTRUM ANALYZER

Filed July 31, 1956

INVENTOR

BY

ATTORNEY

United States Patent Office 2,967,274

Patented Jan. 3, 1961

2,967,274

RECORDING SPECTRUM ANALYZER

Hyman Hurvitz, 1313 Juniper St., Washington, D.C.

Filed July 31, 1956, Ser. No. 601,199

16 Claims. (Cl. 324—77)

The present invention relates generally to spectrum analyzers, and more particularly to systems for recording the frequency components of a complex wave, as such, or as a plot of frequency versus amplitude.

Briefly describing a first preferred embodiment of the present invention, a strip of electro-sensitive recording medium is moved past and under a plurality of stationary transversely arrayed styli. In series with each of the styli is a distinct and separate band-pass filter, and the filters are so selected that each selects a different frequency and in toto they cover a predetermined band of frequencies with sufficient overlap between adjacent filters that no gaps in coverage occur. A conductive platen is placed under the recording medium in contact therewith, and under the styli. Electric current can thus flow via any of the filters through the stylus in series therewith, through the recording medium and to the conductive platen. A band of frequencies is applied simultaneously to all the styli. Thereby, a mark is made on the recording medium under each stylus which is supplied with current by the filter connected thereto, in response to the band of frequencies.

In series between the platen and a ground point is provided a series resistance. The voltage developed across this resistance contains, then, all the frequencies of the original band. These frequencies are amplified in a power amplifier and fed regeneratively or degeneratively back to the input circuits of the filters. Since only frequencies present in the original band are present in the resistance, only those frequencies are regenerated or degenerated, and the power amplifier supplies substantially all the power required for recording. Control of gain of the power amplifier, moreover, serves to control the intensity of the recording and the selectively of the filters. Since the system may be regenerative it is essential that the gain of the feed-back loop be less than one, if continuous oscillations are to be avoided. Control of feed-back permits control of selectivity of the filters.

In accordance with a modification of the present invention a sheet of electro-sensitive recording medium is wrapped around a cylindrical conductive platen, and stationary styli extend axially of the platen, each stylus being in series with a differently tuned band-pass filter. Adjacent filters overlap slightly in frequency response, and the filters, taken together, cover a band of frequencies. Signals derived from the platen, and comprising all frequencies passed by the filters from a suitable spectrum source, are regeneratively applied to the filters by a power amplifier having a gain of less than one.

The spectrum source may be connected with the filters via a gating device, which supplies signals to the filters always at the same time and for the same time interval, in a recording cycle, i.e., during a rotation of the platen. The filters, since they are high Q filters, tend to respond slowly to a signal, i.e., they have long build-up times. These build-up times are increased by the regenerative circuits, if the gain of the latter approaches unity. It may be assumed, therefore, that the filters each passes maximum current some time after the spectrum source is connected therewith, and more particularly during the first 180 degrees of rotation of the platen. Thereafter, the spectrum source is disconnected and the signals commence to decay. Decay time is extended just as much as rise time was increased, by the regenerative loop, and accordingly decay time may extend over most of the remaining time of rotation of the platen, for a sufficiently high intensity signal. In the sense of the discussion decay is complete when recording current becomes too low to make a mark, however slight.

It follows that each signal will generate a marker having a length circumferentially of the platen which is a function of its original amplitude, and that the final recording will be a plot of frequency versus amplitude.

The total recording current required to produce an adequate recording is a function of the velocity of the recording medium. If the cylinder rotates rapidly, then, a very high current, say 50 to 100 mils, may be required to record a distinctly visible mark, for one pass of the recording medium past the styli. In the last described system this is of no consequence since the recording operation is repetitive, and as many as 15 passes per second are readily feasible. It follows that a relatively low value of recording current is adequate to generate a distinct record, provided sufficient time is available. So, a current of 1 mil may be adequate if several seconds are allowed for generating a plot, at the 15 r.p.s. rate of rotation of the recording cylinder.

It is, accordingly, a broad object of the present invention to provide a novel system for recording the frequency content of a frequency band.

It is another object of the present invention to provide a novel system for generating a plot of frequency versus amplitude.

It is another object of the invention to provide a system for simultaneously recording the frequency content of a frequency spectrum by means of a regenerative recording system.

It is a further object of the invention to provide a system for measuring the amplitude of an A.-C. signal by measuring its decay time in a resonant device or circuit.

The above and still further objects, features and advantages of the present invention will become apparent upon consideration of the following detailed description of one specific embodiment thereof, especially when taken in conjunction with the accompanying drawings, wherein.

Figures 1, 2, 3:
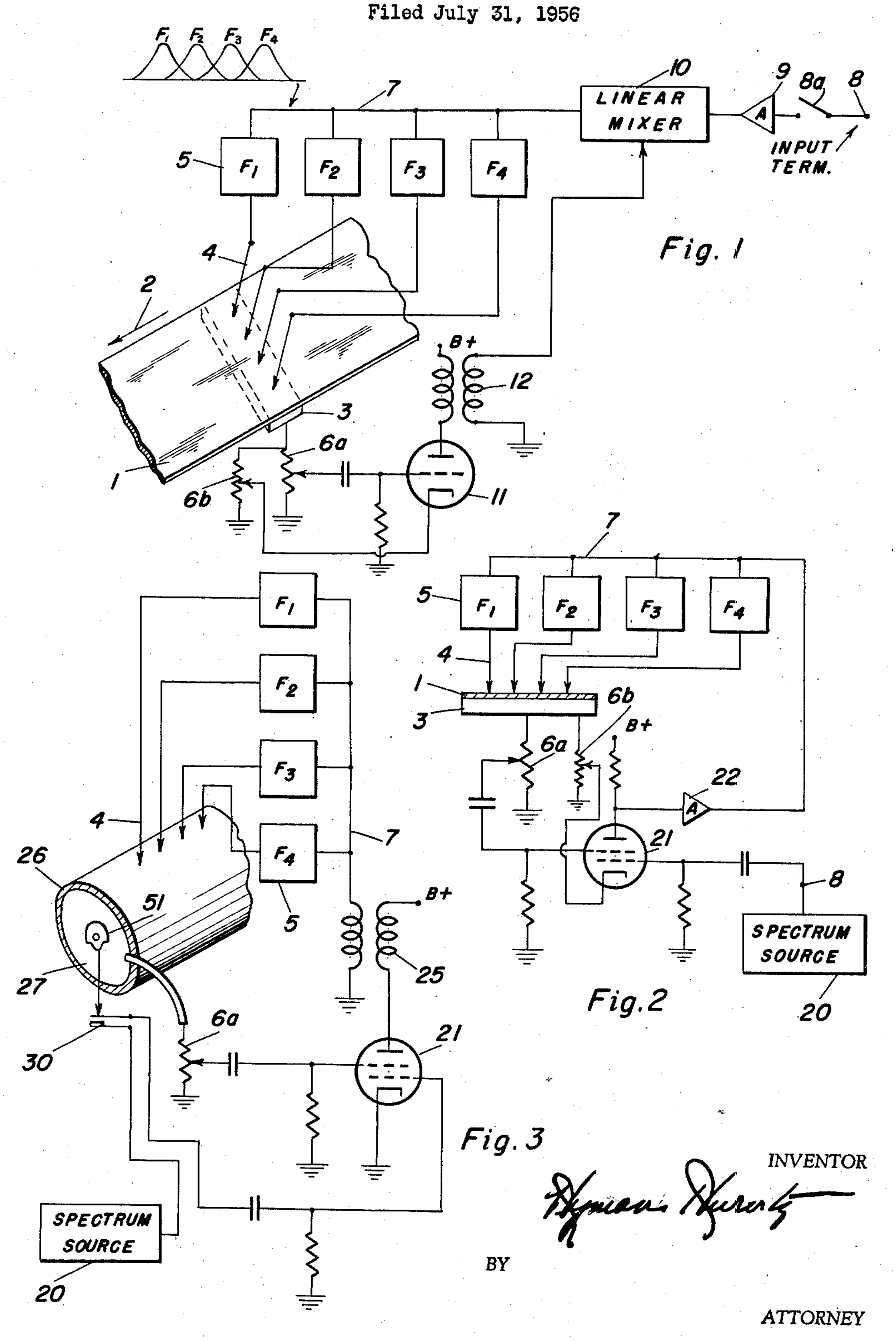
Figure 1 is a schematic representation of a regenerative recording system for recording frequency content of a spectrum of frequencies.
Figure 2 is a schematic representation of a modification of the system of Figure 1.
Figure 3 is a schematic representation of a device for generating a plot of frequency versus amplitude of the frequency content of a spectrum of frequencies, on an electron-sensitive premanent recording medium.

Referring now more particularly to Figure 1 of the accompanying drawings, the reference numeral 1 denotes a strip of recording medium of the electro-sensitive type, such as Teledeltos paper, which is moving in the direction of the arrow 2. Under the strip 1 is a stationary platen 3, on which the strip 2 rests. A plurality of stationary styli 4 contact the strip 2, in superposition of platen 3. In series with each of styli 4 is a different bandpass filter 5. The filters 5 are tuned, respectively, to different frequencies F1, F2, F3, F4, which have such selectivities that some overlap of selectivities of adjacent filters occurs. Together the filters 5 cover a band of frequencies, and at least one filter will respond to any frequency in the band.

As many filters and styli may be employed as is desired, and the degree of overlap may be as great or as little as desired. In the limit no overlap is required. For example, if the frequencies of short pulse signals are to be analyzed, since these have broad spectra the filters may be separated in response by almost the width of the pulse spectra without involving the possibility that a signal can occur which will not effect a response in at least one filter.

Connected between the platen 3 and ground are two equal parallel resistances 6a, 6b and in series with the filters 5, having their input terminals connected in parallel by a lead 7, is an input terminal 8 to which may be applied a source of signals, or input spectrum, for analysis. The terminal 8 is connected to lead 7 via a switch 8a an isolating amplifier 9 and a linear mixer 10. To the linear mixer 10 is supplied feed-back deriving from a power amplifier 11, having a transformer loaded plate circuit, the secondary winding 12 of which has one terminal connected to ground and the other terminal connected to the linear mixer 10. The grid circuit of amplifier 11 is connected via a variable tap to the resistance 6a and the cathode circuit via another variable tap to resistance 6b.

In operation, if a frequency F1 only is applied to terminal 8, a signal of frequency F1 only will appear across resistance 6, which will be amplified by amplifier 11 and fed to the lead 7, for retransmission to filter F1 and the corresponding stylus 5. The gain of the amplifier 11 and its associated circuit is always less than 1, so that oscillations will not occur, and gain adjustment as well as adjustment for regeneration or degeneration may be made by adjusting the variable taps of resistances 6a, 6b. So long as the feed-back signal across the tapped portion of resistances 6a, 6b is less than the original signal the system is stable, even if feed-back is regenerative. The character and extent of variation of selectivity of the filter may be controlled by controlling the character and amplitude of feed-back.

The advantages of the system of Figure 1 are that the major part of the writing current supplied to the styli 4 may derive from the amplifier 11, and further that the selectivities of filter 5 may be varied by adjusting the gain sign of the feed-back of amplifier 11. By utilizing an amplifier operating as a constant voltage source, the total writing current may be made high without involving high voltages. So, if writing voltage is 15 volts and if fifty styli are simultaneously to write, each of which requires 10 mils of writing current, the amplifier can readily supply 500 mils will be supplied, still at 15 v. There is thus no danger of a burn-out.

The filters 5 are series resonant, or band pass, and may each consist of a piezo-electric crystal with suitable electrodes, if desired, or for low frequencies of a resonant reed.

In the system of Figure 1 the spectrum source must supply sufficient current to enable development of a feed-back signal. It is advantageous to avoid this necessity, in order to render the equipment more versatile. In accordance with the system of Figure 2 the same vacuum tube is employed for spectrum insertion and as part of a regenerative feed-back loop.

Referring now more particularly to Figure 2 of the accompanying drawings, and identifying the same parts in Figures 1 and 2 by the same numerals of reference, signal from a spectrum source 20 is applied to terminal 8, which is conventionally coupled to one grid of a vacuum tube 21. The remaining grid is connected to the slider of resistance 6a, and the cathode to the slider of resistance 6b. The amplified output of tube 21 is applied via a power amplifier 22 to lead 7. Accordingly, one grid of tube 21 is used to insert signal into the loop system from an external source, another grid to insert regenerative feed-back signal, and the cathode to insert degenerative feed-back. These two grids are driven in phase and by adjusting the gain or output of the loop by varying the position of the sliders on resistor 6a, 6b the selectivity of the filters may be varied, at will.

The systems of Figures 1 and 2 provide for the recording of the frequency content of a frequency, but do not indicate, except qualitatively in terms of density of recording, the amplitude of signal at any particular frequency.

In the system of Figure 3, a wide band of signals deriving from a spectrum source 20 is applied to one control grid of a current amplifier 21, and provides current output from a plate transformer 25, which applies the current to a lead 7 and thence to selective filters 5, and to styli 4. The styli bear against a sheet of electro-sensitive paper 26, wound once about a conductive platen 27. The platen 27 is connected to ground through potentiometer 6a, from which a signal is tapped to a control grid of tube 21. The system of Figure 3, as described in the present paragraph essentially duplicates that of Figures 1 and 2.

A switch 30, which is normally open, maintains the source 20 disconnected from the grid of tube 21. The switch 30 is closed for 180° of rotation of platen 27 once during each rotation of cylinder 27, by a cam 31 secured to the shaft.

When the switch 30 is closed signals from the spectrum source 20 cause oscillation of the filters 5. When the switch 30 is opened the oscillations tend to die down. The tube 21 regenerates the oscillations, but does not provide a self-oscillating circuit, but only an increase of decay time. The total decay time to a value for which recording ceases, for each frequency, depends then on its original amplitude, and an amplitude versus frequency record is generated.

If recording speed is too high to provide an adequate record in one pass of the paper 26 by the styli 4, this is of no moment, since successive rotations of the cylinder 27 will eventually produce a heavy, readily visible record.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. In a system for visually indicating the frequency content of a frequency band, an electro-sensitive strip adapted to provide a visible mark in response to passage of electric current therethrough, a first electrode, a second electrode, said electrodes displaced transversely of said strip, means for relatively moving said strip and electrodes longitudinally of said strip, a first filter in series with said first electrode, a second filter in series with said second electrode, and a feed-back loop for feeding back all signals passed through said strip via said electrodes to said filters, said feed-back loop including an amplifier and having a gain of less than unity.

2. In a system for marking an electro-sensitive material, a pair of conductors contacting said electro-sensitive material and separated thereby to provide a current path through said electro-sensitive material, a band-pass filter in series with one of said conductors, and a series feed-back loop including said filter, said one of said conductors, said electro-sensitive material and the other of said conductors, said feed-back loop including an amplifier having a gain of less than unity for frequencies passed by said band-pass filter.

3. The combination in accordance with claim 2, wherein is provided means for transiently passing a signal of a frequency passed by said filter into said feed-back loop from an external source, for a time adequate to enable build-up of response of said filter to a value substantially higher than is required to mark said material.

4. In combination in a recorder, means for building up oscillatory current in a resonant circuit to a first value determined by the amplitude of an impressed signal, and means for making a linear mark having a length determined by the first value in response to said current during its decay, from said first value to a second predetermined value.

5. In combination, a resonant circuit, a source of signal of predetermined amplitude having a frequency to which said resonant circuit is resonant, means for connecting said source of signal to said resonant circuit for a time interval and for thereafter disconnecting said source of signal from said resonant circuit, said time interval adequate to enable maximum of current flow in said resonant circuit in response to said signal, and means for measuring decay time of said current to predetermined level following the disconnection as a measure of said maximum current flow.

6. In a system for making marks on a longitudinally moving electro-sensitive medium, a plurality of stationary styli arranged transversely of said medium and in contact therewith on one side thereof, a conductive platen on the other side of said medium facing said styli and in contact with said medium, a differently tuned resonant filter in series with each of said styli, a common connection for the input circuits of all said filters, a loop including an amplifier, said platen, said medium and said common connection all in series, and means for injecting a spectrum of frequencies to which said filters are responsive into said loop.

7. The combination in accordance with claim 6, wherein said medium is adapted to provide a mark only in response to signal strength above a predetermined value, and said last means is arranged to inject said signal for only a sufficient duration to enable said filters to build up their transient responses above said value required for marking said medium, the decay times of the filter responses being indicated by the lengths of said markings made following said durations, and said decay times being representative of the amplitudes of the injected signals.

8. In a system for marking on an electro-sensitive medium, a resonant filter, means for applying for a time interval to said resonant filter a signal of frequency to which said filter is resonant, said signal being of predetermined amplitude, whereby the magnitude of current flow in said filter attains a value representative of said amplitude, means for marking a straight line on said electro-sensitive medium in response to current flow in said filter from a time following said time interval and means for relatively moving said means for marking and said medium only during said time following said time interval and until said signal decays to a predetermined level.

9. In combination, a filter resonant to a predetermined frequency, a source of said frequency, a regenerative feed-back loop having a gain of less than unity and including said filter, means for injecting said frequency from said source into said feed-back loop for an interval of time, and means for visually indicating the decay time of current of said frequency in said loop in response to said current.

10. In a visual indicating system, a source of a pulse of alternating current signal of predetermined frequency and of amplitude to be measured, a circuit resonant to said predetermined frequency, means for applying said pulse to said circuit, and means for visually indicating the decay time down to a predetermined level of the response of said circuit to said pulse as a measure of said amplitude.

11. In combination, a source of a plurality of alternating current pulses all occurring at the same time and for the same duration, each of said pulses being of different frequency and of random amplitudes which are to be measured, a plurality of resonant circuits connected in parallel and each tuned to a different one of said frequencies, means for applying said pulses simultaneously to said resonant circuits, and means for individually visually indicating the decay time of the response of each of said filters to said pulses as measures of the amplitudes of said pulses.

12. The combination according to claim 11, wherein is provided a single regenerative feed-back loop including said filters, said loop having a gain of less than unity for any of said frequencies.

13. The combination in accordance with claim 12, wherein is provided a separate electrode coupled to each of said filters, an electro-sensitive indicating medium in contact with each of said electrodes, and means for effecting relative motion of said medium and said electrodes.

14. In a system for recording the amplitudes and frequencies of a plurality of signals existent in a frequency band on a strip of electrosensitive recording material adapted to provide a visible mark in response only to application of at least a predetermined magnitude of electric signal thereto, a plurality of electrodes in contact with said strip on one side thereof, said electrodes spaced from each other and extending transversely of said strip, a plurality of band-pass filters together having a pass band coincident with said frequency band, and having center frequencies disposed across said frequency band in ordered array, means for connecting each of said electrodes with a different one of said filters in signal transfer relation, means for applying said signals in parallel to all said filters for a time adequate for the responses of said filters to attain steady state at above said predetermined magnitude and for thereafter disconnecting said signals from said filters, and means for moving said strip with respect to said electrodes from a reference position and during decay of the responses of said filters to values below said predetermined magnitude.

15. In combination a resonant circuit, a source of signal of predetermined amplitude having a frequency to which said resonant circuit is resonant, means for connecting said source of signal to said resonant circuit for a time interval and for thereafter disconnecting said source of signal from said resonant circuit, said time interval adequate to enable maximum of current flow in said resonant circuit in response to said signal, and means for measuring decay time of said current to a predetermined level greater than zero following the disconnection as a measure of said maximum current flow, wherein is provided a regenerative amplifying loop including said resonant circuit, said loop having a gain of less than unity, whereby decay time of said resonant circuit is increased.

16. In a visual indicating system, a source of a pulse of alternating current signal of predetermined frequency and of amplitude to be measured, a circuit resonant to said predetermined frequency, means for applying said pulse to said circuit, and means for visually indicating the decay time down to a predetermined level greater than zero of the response of said circuit to said pulse as a measure of said amplitude, wherein said circuit is included in a regenerative loop having gain of less than unity.

References Cited in the file of this patent

UNITED STATES PATENTS

| | | |
|---|---|---|
| 2,159,790 | Freystedt | May 23, 1939 |
| 2,459,046 | Rieke | Jan. 11, 1949 |
| 2,530,693 | Green | Nov. 21, 1950 |
| 2,537,132 | Guanella | Jan. 9, 1951 |
| 2,574,470 | Finney | Nov. 13, 1951 |
| 2,582,851 | Ruge | Jan. 13, 1952 |
| 2,596,118 | Bischoff | May 13, 1952 |
| 2,629,000 | Olson | Feb. 17, 1953 |
| 2,632,036 | Hurvitz | Mar. 17, 1953 |
| 2,639,209 | Gamerekian | May 19, 1953 |
| 2,739,865 | Willey | Mar. 27, 1956 |

OTHER REFERENCES

Du Mont Oscillographer, volume 7, No. 2, March-April, 1945; pages 1–4.

"Single Frequency Harmonic Analyzer," article in Electronics, December, 1953; pages 192–193.